US012715523B2

(12) United States Patent
Lee et al.

(10) Patent No.: US 12,715,523 B2
(45) Date of Patent: Aug. 25, 2026

(54) DUAL SPOILER APPARATUS

(71) Applicants: HYUNDAI MOTOR COMPANY, Seoul (KR); KIA CORPORATION, Seoul (KR); SHB Automotive Module Co., Ltd., Gyeongsan-si (KR)

(72) Inventors: Hong Heui Lee, Suwon-si (KR); Jin Young Yoon, Gimpo-si (KR); Dong Eun Cha, Hwaseong-si (KR); Dong Ha Kim, Gwacheon-si (KR); Jeong Bok Lee, Gyeongsan-si (KR); Sung Hoon Son, Gyeongsan-si (KR); Bo Hwan Cha, Gyeongsan-si (KR)

(73) Assignees: HYUNDAI MOTOR COMPANY, Seoul (KR); KIA CORPORATION, Seoul (KR); SHB Automotive Module Co., Ltd., Gyeongsan-si (KR)

( * ) Notice: Subject to any disclaimer, the term of this patent is extended or adjusted under 35 U.S.C. 154(b) by 329 days.

(21) Appl. No.: 18/609,791

(22) Filed: Mar. 19, 2024

(65) Prior Publication Data

US 2025/0121894 A1 Apr. 17, 2025

(30) Foreign Application Priority Data

Oct. 16, 2023 (KR) ........................ 10-2023-0137952

(51) Int. Cl.
*B62D 35/00* (2006.01)

(52) U.S. Cl.
CPC .................................. *B62D 35/007* (2013.01)

(58) Field of Classification Search
CPC ..... B62D 35/007; B62D 37/02; B62D 35/005
See application file for complete search history.

(56) References Cited

U.S. PATENT DOCUMENTS

| | | | | | |
|---|---|---|---|---|---|
| 4,660,879 | A * | 4/1987 | Kobayashi | B62D 35/007 | 180/2.2 |
| 4,925,236 | A * | 5/1990 | Itoh | B62D 37/02 | 296/180.1 |
| 9,352,791 | B2 * | 5/2016 | Wolf | B62D 35/007 | |
| 9,499,217 | B2 * | 11/2016 | Jeong | B62D 35/007 | |
| 9,975,585 | B2 * | 5/2018 | Auden | G07C 5/08 | |
| 10,112,658 | B2 * | 10/2018 | Yoon | B62D 37/02 | |
| 10,625,791 | B2 * | 4/2020 | Fahland | B62D 37/02 | |
| 11,993,320 | B2 * | 5/2024 | Nakamura | B62D 37/02 | |

(Continued)

FOREIGN PATENT DOCUMENTS

| | | | | | |
|---|---|---|---|---|---|
| CN | 217124958 | U * | 8/2022 | | |
| CN | 120207452 | A * | 6/2025 | B62D 35/007 | |

(Continued)

*Primary Examiner* — Jason S Morrow
(74) *Attorney, Agent, or Firm* — Lempia Summerfield Katz LLC

(57) ABSTRACT

A dual spoiler apparatus changes a tilting angle and a length of an air spoiler to control the air flow to the rear of a vehicle, so as to improve aerodynamic performance and simplify parts for tilting and length change. The dual spoiler apparatus includes: a first spoiler device configured to slide on a spoiler mounting portion in a first direction; a second spoiler device configured to tilt on the spoiler mounting portion in a second direction; and a driving device configured to switch a sliding position of the first spoiler device and a tilting position of the second spoiler device.

17 Claims, 12 Drawing Sheets

(56) References Cited

U.S. PATENT DOCUMENTS

| | | | | |
|---|---|---|---|---|
| 12,263,780 | B2 * | 4/2025 | Lee | B60Q 1/302 |
| 2023/0014189 | A1 * | 1/2023 | Mitchell | B62D 35/007 |
| 2024/0351644 | A1 * | 10/2024 | Onishi | B62D 35/007 |

FOREIGN PATENT DOCUMENTS

| | | | | | |
|---|---|---|---|---|---|
| DE | 102014117928 | A1 | * | 2/2016 | B62D 35/007 |
| DE | 102016105994 | B4 | * | 6/2025 | B62D 35/007 |
| JP | H06321143 | A | * | 11/1994 | |
| JP | 2009248746 | A | | 10/2009 | |
| KR | 101581007 | B1 | * | 12/2015 | B62D 25/087 |
| KR | 20240168099 | A | | 11/2024 | |

* cited by examiner

DUAL SPOILER APPARATUS

CROSS-REFERENCE TO RELATED APPLICATION(S)

This application claims priority under 35 U.S.C. 119 to Korean Patent Application No. 10-2023-0137952, filed on Oct. 16, 2023, the disclosure of which is herein incorporated by reference in its entirety.

BACKGROUND

1. Technical Field

The present disclosure relates to a dual spoiler apparatus that controls the air flow to the rear of a vehicle to improve aerodynamic performance.

2. Description of the Prior Art

When driving at high speeds or turning, the grip force of the rear tires is reduced, which is disadvantageous for increasing driving speed and deteriorates driving stability.

To solve this problem, an air spoiler is installed at the rear of the vehicle to change the flow of air passing around the vehicle and produce pressure to press the vehicle according to the air flow around the air spoiler, thereby improving the grip force of the rear tires.

This air spoiler is installed at the rear of the vehicle, which restricts the freedom of design. Once the air spoiler is installed, it is difficult to change the design, and when applied to a high-end vehicle, the design is hindered by the installation of the air spoiler.

As described above, the air spoiler is only a technology for improving aerodynamic performance in order to improve vehicle fuel efficiency and driving stability. In order to further improve aerodynamic performance, the shape of the vehicle must be changed or the specifications of the air spoiler must be changed.

In addition, in the case of SUV vehicles, there are constraints on the installation space for the air spoiler, making it limited to modify the specifications of the air spoiler. For example, since space is required for the installation of parts for opening and closing the tailgate at the rear of the vehicle, there are space constraints when installing parts to provide a specific function to the air spoiler.

The foregoing, described as the background art, is intended merely to aid in the understanding of the background of the present disclosure and is not intended to mean that the present disclosure falls within the purview of the related art already known to those having ordinary skill in the art.

SUMMARY

The present disclosure has been made in order to solve the above-mentioned problems in the prior art. An aspect of the present disclosure provides a dual spoiler apparatus that is configured to change the tilting angle and length of the air spoiler to control the air flow to the rear of the vehicle, thereby improving aerodynamic performance. The present disclosure also simplifies parts for tilting and length change, thereby leading to a reduction in required installation space and the resolution of quality issues.

According to an embodiment of the present disclosure, a dual spoiler apparatus may include: a first spoiler device configured to slide on a spoiler mounting portion in the forward and backward directions of a vehicle; and a second spoiler device configured to tilt on the spoiler mounting portion in the upward and downward directions of the vehicle. The dual spoiler apparatus further includes: a driving device to which the first spoiler device and the second spoiler device are connected. In particular, the driving device may generate driving force to switch a sliding position of the first spoiler device and a tilting position of the second spoiler device.

The spoiler mounting portion may correspond to the upper rear part of the vehicle, and may be configured to slide toward the rear of the vehicle when the first spoiler device is extended and increase in the angle thereof when a second spoiler is deployed, thereby tilting.

The first spoiler device may include: a first rotation shaft configured to rotate by receiving the driving force of the driving device; and a first spoiler connected to the first rotation shaft and configured to slide when the first rotation shaft rotates. The second spoiler device may include: a second rotation shaft configured to rotate by receiving the driving force of the driving device; and a second spoiler connected to the second rotation shaft and configured to tilt when the second rotation shaft rotates.

The first spoiler device may further include a guide rail and a movement part. In particular, the guide rail may be installed in the spoiler mounting portion and may extend in the forward and backward directions. The movement part may be provided to be movable on the guide rail, and the first spoiler is mounted to the movement part. The first rotation shaft is connected to the movement part. With this configuration, the movement part may move on the guide rail when driving force is transmitted, thereby switching the position of the first spoiler.

The second spoiler device may further include a linkage mechanism, and the linkage mechanism may be installed in the spoiler mounting portion. The second spoiler is mounted to the linkage mechanism, and the linkage mechanism may be configured as a plurality of links to which the second rotation shaft is connected. Thus, when driving force is transmitted, the respective links rotate to change the overall length thereof, thereby switching the tilting position of the second spoiler.

The driving device may include a first driving unit and a second driving unit. The first rotation shaft may be connected to the first driving unit, and the second rotation shaft may be connected to the second driving unit.

The driving device may include a driving motor and a connecting unit, and the connecting unit may include an electromagnet part and a connecting part. The connecting unit may be configured to be selectively connected to the first rotation shaft or the second rotation shaft depending on the movement position of the connecting part so as to transmit the driving force of the driving motor.

The driving motor may include a driving shaft, a first driving gear and a second driving gear. The first and second driving gears are configured to freely rotate on the driving shaft. In particular, the first rotation shaft may have a first driven gear to mesh with the first driving gear, and the second rotation shaft may have a second driven gear to mesh with the second driving gear.

The connecting part may be provided between the first driving gear and the second driving gear and may be connected to the first driving gear or the second driving gear as it moves in the axial direction by the electromagnet part.

The connecting part may include a connecting arm coupled to the electromagnet part and extending between the first driving gear and the second driving gear. The connecting part may further include connecting gear parts configured to face the first driving gear and the second driving gear, respectively, in the connecting arm, mesh with the first driving gear or the second driving gear, and have a driving shaft connected to pass therethrough.

Fastening gear parts may be formed in the first driving gear and the second driving gear, respectively, and the connecting gear part may be provided at the outer circumference of the fastening gear part so as to match the same. The connecting gear part may have a thread formed on the inner surface thereof, and may be configured to rotate freely on the connecting arm.

The connecting part may include a first stopper and a second stopper provided therein, and the first stopper and the second stopper may come into contact with the first driven gear or the second driven gear, respectively, depending on the movement position of the connecting part such that one of the first stopper and the second stopper comes into contact with the first or second driven gear while the other is separated from the second or first driven gear.

The first driven gear may have first through-holes formed in the circumferential direction thereof, and the second driven gear may have second through-holes formed in the circumferential direction thereof. In particular, the first stopper is configured to be insertable into the first through-holes, and the second stopper is configured to be insertable into the second through-holes.

When the sliding position of the first spoiler device switches, the connecting part may be connected to the first driving gear, so that the first stopper is separated from the first driven gear and so that the second stopper comes into contact with the second driven gear. When the tilting position of the second spoiler device switches, the connecting part may be connected to the second driving gear, so that the first stopper comes into contact with the first driven gear and so that the second stopper is separated from the second driven gear.

In another embodiment, the dual spoiler apparatus may further include a controller configured to control the driving device. The controller may control the positions of the first spoiler device and the second spoiler device depending on a driving speed.

The controller may control, if the driving speed of the vehicle accelerates, the driving device such that the first spoiler device or the second spoiler device is deployed in stages in proportion to the amount of acceleration.

The controller may control, if it is determined that the driving speed of the vehicle rapidly decelerates, the driving device such that the first spoiler device is retracted and such that the second spoiler device is deployed to have the maximum tilting angle.

Since the dual spoiler apparatus in the above-described structure is configured to change the tilting angle and length of the air spoiler, it is possible to improve aerodynamic performance by controlling the air flow to the rear of the vehicle and simplify parts for tilting and length change, thereby reducing installation space and solving quality problems.

BRIEF DESCRIPTION OF THE DRAWINGS

The above and other aspects, features, and advantages of the present disclosure should be more apparent from the following detailed description taken in conjunction with the accompanying drawings, in which.

DETAILED DESCRIPTION

Figure 1:
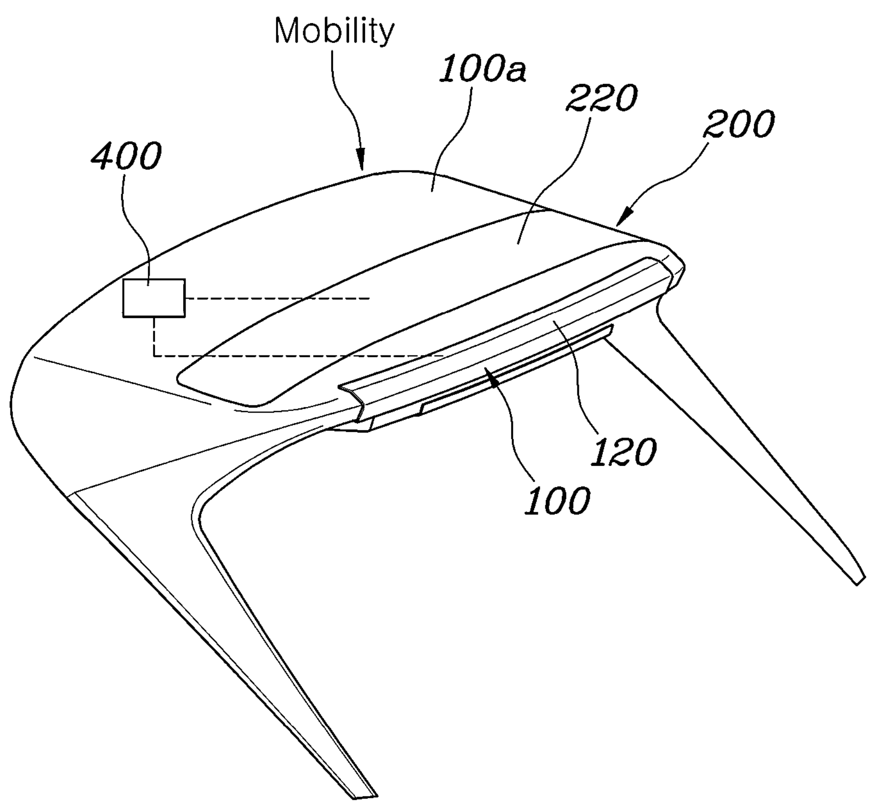
FIG. 1 is a diagram illustrating a dual spoiler apparatus according to an embodiment of the present disclosure.

Hereinafter, embodiments disclosed in the present disclosure are described in detail with reference to the accompanying drawings, and the same or similar elements are given the same and similar reference numerals, so duplicate descriptions thereof have been omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description is omitted. Furthermore, the accompanying drawings are provided only for easy understanding of the embodiments disclosed in the present disclosure, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

When a component, device, element, or the like of the present disclosure is described as having a purpose or performing an operation, function, or the like, the component, device, or element should be considered herein as being "configured to" meet that purpose or to perform that operation or function.

The controller may include a communication device configured to communicate with a sensor or another control unit, a memory configured to store an operation system, a logic command, or input/output information, and at least one processor configured to perform determination, calculation, decision, or the like which are required for responsible function control.

Hereinafter, a dual spoiler apparatus according to an embodiment of the present disclosure is described with reference to the attached drawings.

Figure 2:
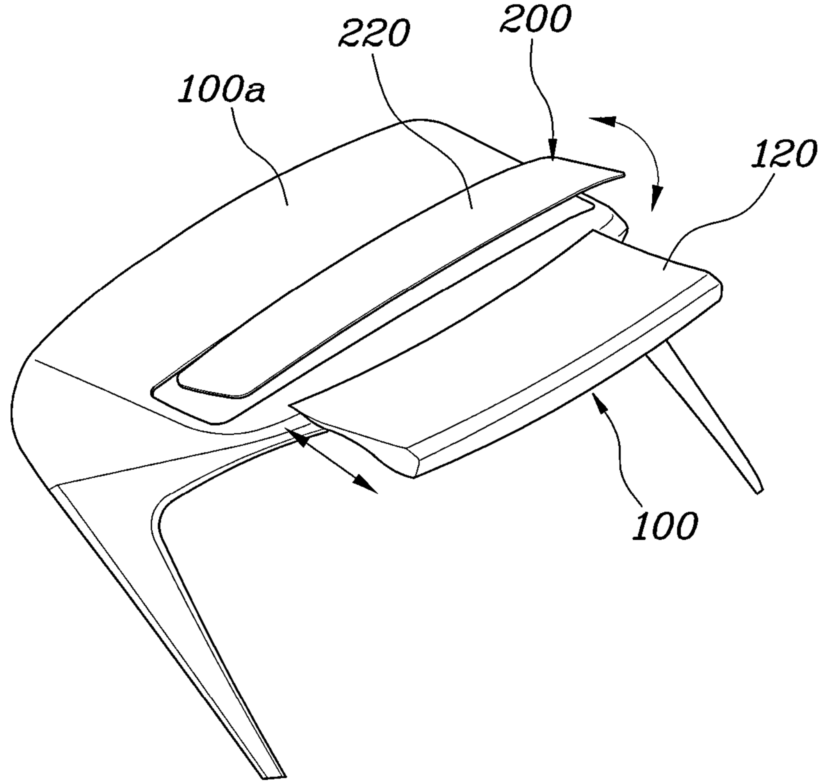
FIG. 2 is a diagram illustrating the deployed state of the dual spoiler apparatus shown in FIG. 1.

As shown in FIGS. 1 and 2, a dual spoiler apparatus according to the present disclosure includes: a first spoiler device 100 that slides on the spoiler mounting portion 100*a* in the forward and backward directions of a vehicle, and a second spoiler device 200 that tilts on the spoiler mounting portion 100*a* in the upward and downward directions of the vehicle. The dual spoiler apparatus further includes a driving device 300 having the first spoiler device 100 and the second spoiler device 200 connected thereto and generating driving force to switch the sliding position of the first spoiler device 100 and the tilting position of the second spoiler device 200.

The first spoiler device 100 is extended or retracted while sliding in the forward and backward directions on the spoiler mounting portion 100*a*, and the second spoiler device 200 is deployed or housed while the tilting angle changes on the spoiler mounting portion 100*a*.

Here, the spoiler mounting portion 100*a* may correspond to the upper rear part of the vehicle, and the first spoiler device 100 and the second spoiler device 200 may be provided by utilizing the space where the tailgate is installed.

The air flow to the rear of the vehicle may be controlled by the first spoiler device 100 and second spoiler device 200, and as the vortex generated in the rear part of the vehicle is separated from the vehicle, drag force may be reduced so that aerodynamic performance may be improved.

The first spoiler device 100 may be configured to slide up to 150 mm from the rear part of the vehicle to be extended, and the second spoiler device 200 may be implemented to have a tilting angle of up to 90 degrees.

The first spoiler device 100 and second spoiler device 200 are connected to the driving device 300 and their positions switch by the driving force transmitted from the driving device 300. The driving device 300 may selectively generate driving force under the control of the controller 400, and the forward or reverse rotation of the driving device 300 may perform extending or retracting of the first spoiler 120 and deploying or housing of the second spoiler 220.

In one embodiment, the first spoiler device 100 may include: a first rotation shaft 110 that rotates by receiving the driving force of the driving device 300, and a first spoiler 120 that is connected to the first rotation shaft 110 and slides when the first rotation shaft 110 rotates. In another embodiment, the second spoiler device 200 may include: a second rotation shaft 210 that rotates by receiving the driving force of the driving device 300, and a second spoiler 220 that is connected to the second rotation shaft 210 and tilts when the second rotation shaft 210 rotates.

Figure 3:
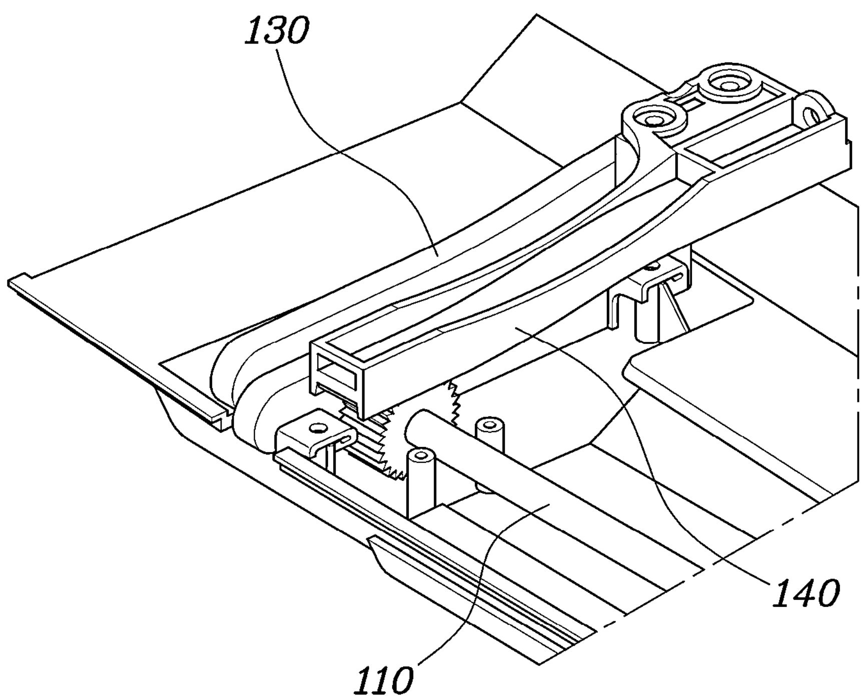
FIG. 3 is a diagram illustrating the guide rail and movement part of the first spoiler device according to an embodiment of the present disclosure.
Figure 4:
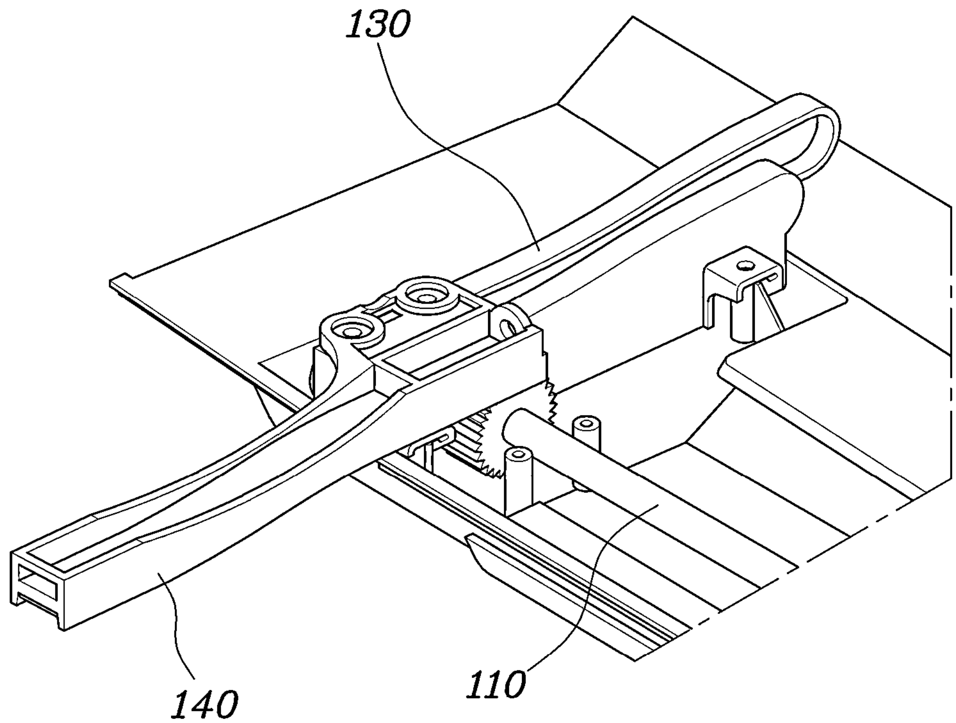
FIG. 4 is a diagram illustrating the extended state of the first spoiler device shown in FIG. 3.

As shown in FIGS. 3 and 4, the first spoiler device 100 is configured as the first rotation shaft 110 and the first spoiler 120 so that the first rotation shaft 110 is connected to the driving device 300 and rotates by receiving driving force thereof and so that the first spoiler 120 slides according to the rotation of the first rotation shaft 110.

Figure 5:
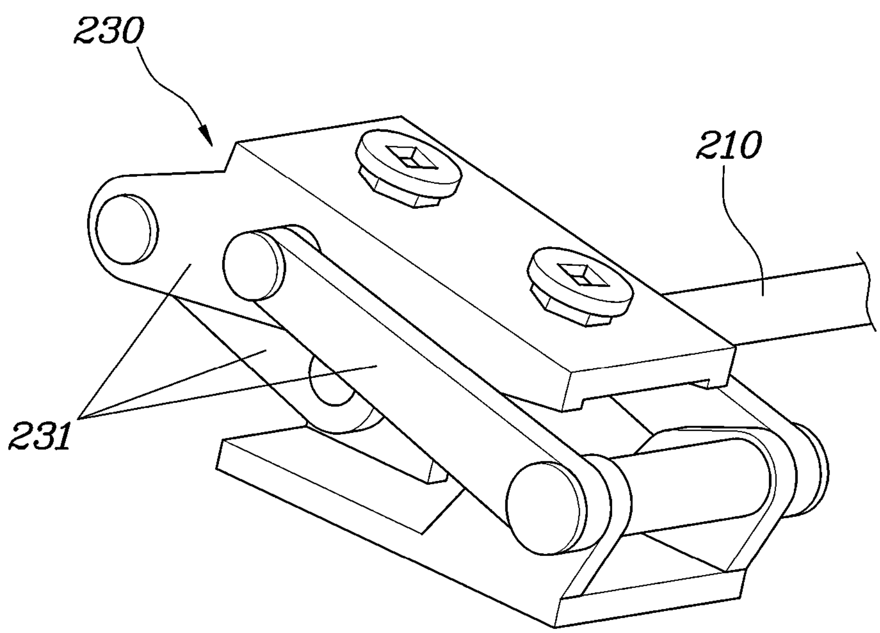
FIG. 5 is a diagram illustrating a linkage mechanism of a second spoiler device according to an embodiment of the present disclosure.
Figure 6:
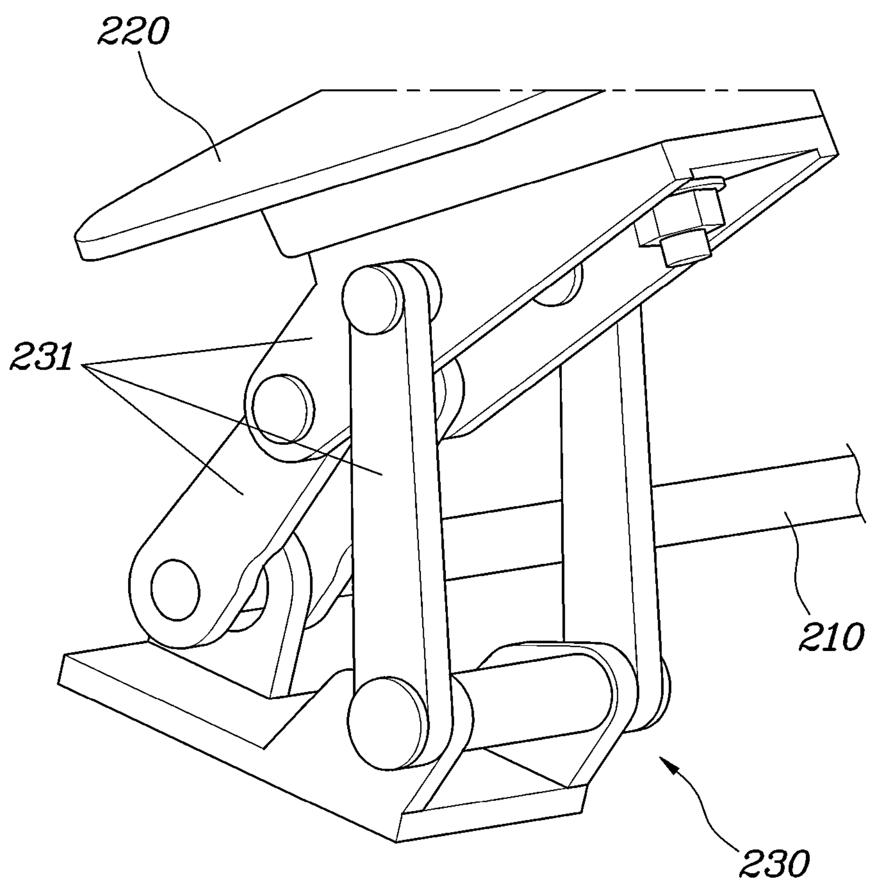
FIG. 6 is a diagram illustrating the deployed state of the second spoiler device shown in FIG. 5.

As shown in FIGS. 5 and 6, the second spoiler device 200 is configured as the second rotation shaft 210 and the second spoiler 220 so that the second rotation shaft 210 is connected to the driving device 300 and rotates by receiving the driving force thereof and so that the second spoiler 220 tilts according to the rotation of the second rotation shaft 210.

Specifically, as shown in FIGS. 3 and 4, a guide rail 130 and a movement part 140 may be further provided in the first spoiler device 100.

The guide rail 130 is installed on the spoiler mounting portion 100*a* and extends in the forward and backward directions. A pair of guide rails 130 may be provided in the spoiler mounting portion 100*a* and may be configured to extend by the distance over which the first spoiler 120 is deployed.

The movement part 140 is provided on the guide rail 130 to be movable and has the first spoiler 120 mounted thereto and the first rotation shaft 110 connected thereto. A groove may be formed on the guide rail 130 in the longitudinal direction thereof, and the movement part 140 may have a protrusion formed to be inserted into the groove, so that the movement of the movement part 140 may be guided along the guide rail 130.

The first rotation shaft 110 may have a pinion gear, and the movement part 140 may be a rack gear so that, when the first rotation shaft 110 rotates, the movement part 140 may move straight according to the rotational force thereof.

Accordingly, the first spoiler 120 may move together with the movement part 140 to be extended from or retracted into the spoiler mounting portion 100*a*.

Meanwhile, as shown in FIGS. 5 and 6, the second spoiler device 200 may further include a linkage mechanism 230.

The linkage mechanism 230 is installed in the spoiler mounting portion 100*a* and includes a plurality of links. The second spoiler 220 is mounted to the linkage mechanism 230.

Here, as the second rotation shaft 210 is connected to any one of the plurality of links, the rotational positions of the respective links change according to the rotation of the second rotation shaft 210, thereby changing its length in the vertical direction by the folding or unfolding operation of the plurality of links due to rotation thereof.

This linkage mechanism 230 may be configured as a three-jointed link, and the second spoiler 220 may be installed in the uppermost link such that the angle of the second spoiler 220 increases as the linkage mechanism 230 unfolds. The angle change of the second spoiler 220 may be configured according to the length of each link.

As described above, the first spoiler device 100 and the second spoiler device 200 may operate to slide or tilt according to the rotation of the first rotation shaft 110 and the second rotation shaft 210, respectively, and the first rotation shaft 110 and the second rotation shaft 210 are connected to the driving device 300 and receive rotational force therefrom.

Figure 7:
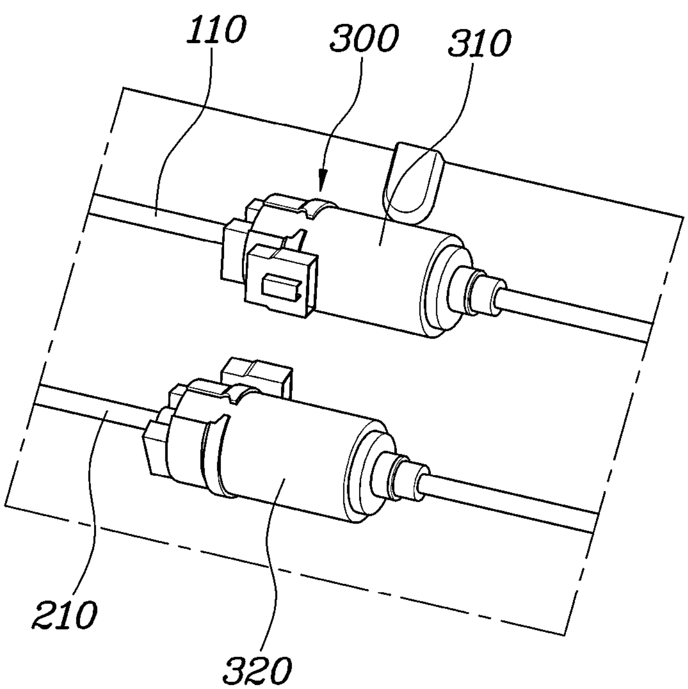
FIG. 7 is a diagram illustrating a driving device according to an embodiment of the present disclosure.

As shown in FIG. 7, the driving device 300 may be configured as a plurality of units, i.e., a first driving unit 310 and a second driving unit 320. In one embodiment, the driving device 300 includes: the first driving unit 310 and the second driving unit 320, and the first rotation shaft 110 is connected the first driving unit 310 and the second rotation shaft 210 is connected to the second driving unit 320, so that the spoiler devices connected to the respective rotation shafts may switch their positions depending on whether or not the respective driving units operate. The first driving unit 310 and the second driving unit 320 may be configured as motors capable of forward and reverse rotation.

In another embodiment, the driving device 300 includes a driving motor 330 and a connecting unit 340, and the connecting unit 340 includes an electromagnet part 350 and a connecting part 360 and is configured to be selectively connected to the first rotation shaft 110 or the second rotation shaft 210 depending on the movement position of the connecting part 360 to transmit the driving force of the driving motor 330, so that any one of the first spoiler device 100 and the second spoiler device 200 switches its position.

Figure 8:
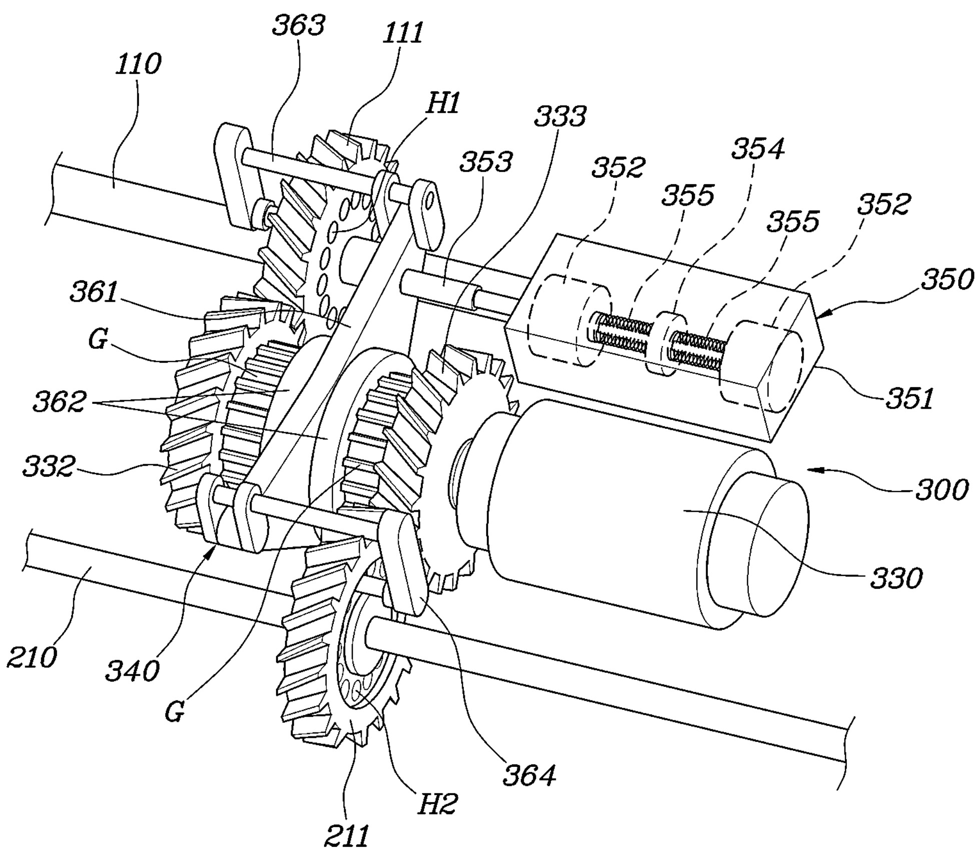
FIG. 8 is a diagram illustrating a driving device according to another embodiment of the present disclosure.
Figure 9:
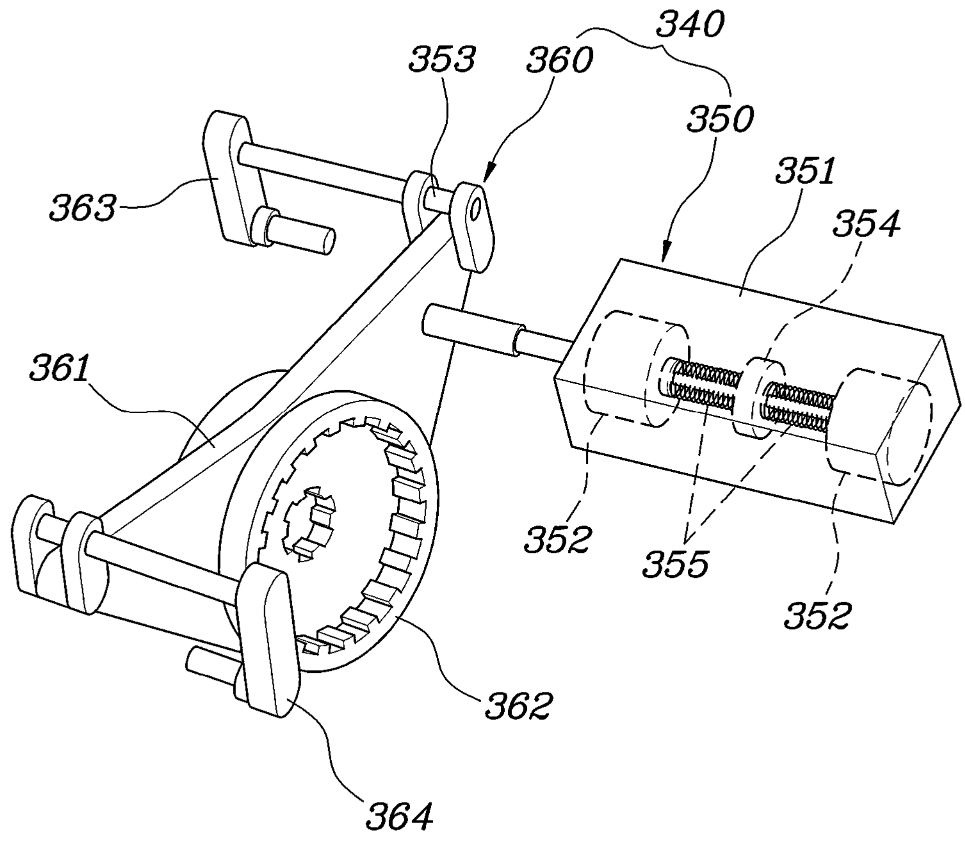
FIG. 9 is a diagram illustrating a driving motor and a connecting unit in the driving device shown in FIG. 8.

As shown in FIGS. 8 and 9, the driving device 300 may include a driving motor 330 and a connecting unit 340. In one form, a single driving motor 330 enables position switching of the first spoiler device 100 and the second spoiler device 200.

The driving motor 330 may be configured as a motor capable of forward and reverse rotation.

The connecting unit 340 may include an electromagnet part 350 and a connecting part 360, and the connecting part 360 may be connected to the electromagnet part 350 so that the position of the connecting part 360 may change depending on whether or not the electromagnet part 350 is powered.

Here, the electromagnet part 350 includes a plurality of electromagnets 352 spaced apart from each other in the housing 351 and a connection shaft 353 such that a stopper 354 is coupled to the connection shaft 353 and an elastic member 355 supports the stopper 354 between the electromagnets 352. Accordingly, if power is applied to the electromagnet 352, the stopper 354 moves, and the connection shaft 353 moves according thereto. As the connecting part 360 is connected to the connection shaft 353, the connecting part 360 may change its position together with the connection shaft 353.

In other words, the position of the connecting part 360 may be determined depending on whether or not the electromagnets 352 operate, and the connecting part 360 may be selectively connected to the first rotation shaft 110 or the second rotation shaft 210 depending on the movement position of the connecting part 360, so that the position of any one of the first spoiler device 100 or the second spoiler device 200 may switch when the driving motor 330 operates.

Specifically, the driving motor 330 may have a driving shaft 331, and a first driving gear 332 and a second driving gear 333 that freely rotate on the driving shaft 331, and the first rotation shaft 110 may have a first driven gear 111 engaged with the first driving gear 332, and the second rotation shaft 210 may have a second driven gear 211 engaged with the second driving gear 333.

In other words, even if the driving motor 330 operates, the driving shaft 331 rotates, but the first driving gear 332 and the second driving gear 333 do not rotate. Accordingly, even if the first driven gear 111 of the first rotation shaft 110 is engaged with the first driving gear 332 and even if the second driven gear 211 of the second rotation shaft 210 is engaged with the second driving gear 333, the first rotation shaft 110 and the second rotation shaft 210 do not rotate when the driving shaft 331 rotates. Here, the first driven gear 111 and the first driving gear 332 may be engaged with each other in a helical gear structure. Similarly, the second driven gear 211 and the second driving gear 333 may be engaged with each other in a helical gear structure.

When the connecting part 360 of the connecting unit 340 is connected to the first rotation shaft 110 or the second rotation shaft 210, the rotational force of the driving motor 330 may be transmitted so that the first rotation shaft 110 or the second rotation shaft 210 to which the connecting part 360 is connected rotates, thereby switching the position of any one of the first spoiler device 100 or the second spoiler device 200.

Figure 10:
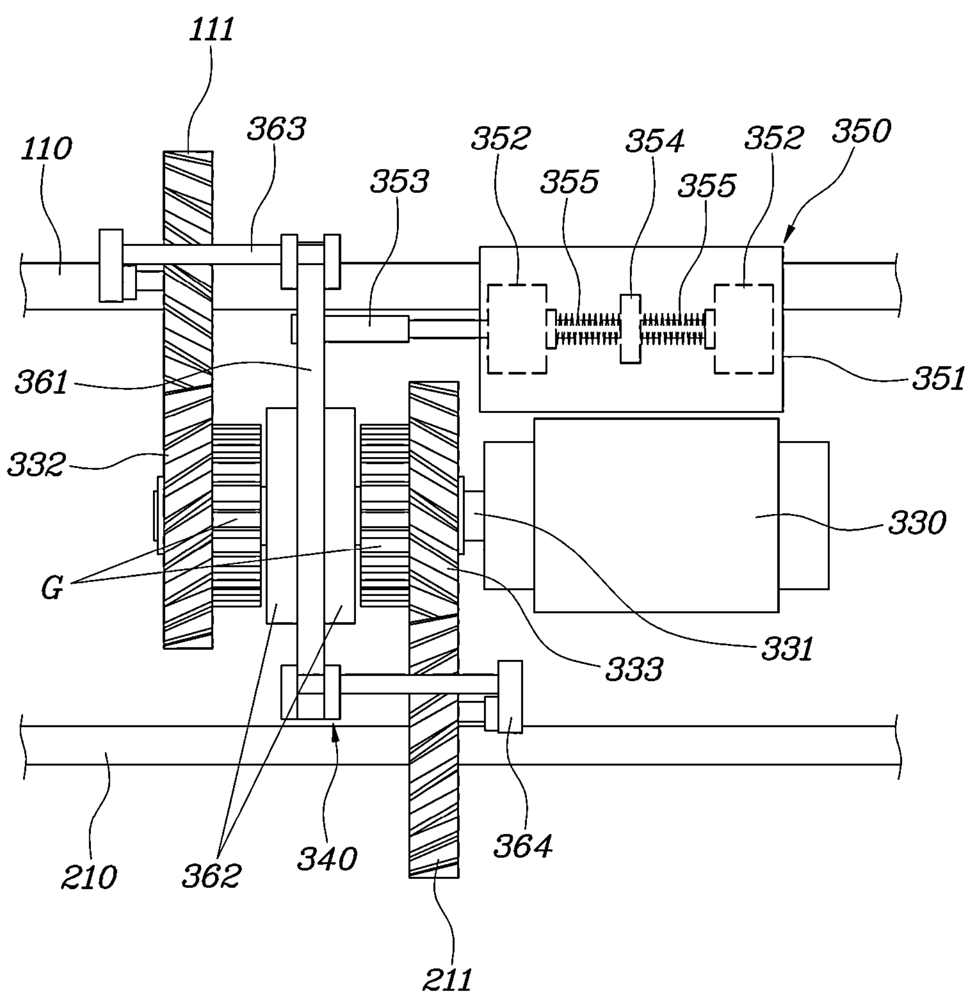
FIG. 10 is a diagram illustrating the basic state of a dual spoiler apparatus according to an embodiment of the present disclosure.

Describing the connecting part 360 in detail, as shown in FIG. 10, the connecting part 360 is provided between the first driving gear 332 and the second driving gear 333, and is connected to the first driving gear 332 or the second driving gear 333 as it moves in the axial direction by the electromagnet part 350.

The connecting part 360 is coupled to the connection shaft 353 of the electromagnet part 350 and is configured to be located between the first driving gear 332 and the second driving gear 333 so as to be connected to the first driving gear 332 or the second driving gear 333 as it moves in the axial direction by the electromagnet part 350. Accordingly, the driving force is transmitted to the driving gear to which the connecting part 360 is connected, among the first driving gear 332 and the second driving gear 333, and the rotation shaft connected to the driving gear through the driven gear rotates, thereby switching the position of the corresponding spoiler.

Here, the connecting part 360 may include a connecting arm 361 that is coupled to the electromagnet part 350 and extends between the first driving gear 332 and the second driving gear 333. The connecting part 360 may further include connecting gear parts 362 that are provided to respectively face the first driving gear 332 and the second driving gear 333 so as to mesh with the first driving gear 332 or the second driving gear 333, and has the driving shaft 331 connected to pass therethrough. In one embodiment, the connecting gear parts 362 are formed in the connecting arm 361.

In other words, the connecting part 360 is configured as the connecting arm 361 and the connecting gear parts 362.

Here, the connecting arm 361 is coupled to the electromagnet part 350, extends between the first driving gear 332 and the second driving gear 333, and has a through-hole portion where the connecting gear parts 362 are provided.

The connecting gear parts 362 are rotatably mounted to the through-hole portion of the connecting arm 361. The connecting gear parts 362 may be mounted in a bearing structure to rotate freely on the connecting arm 361. In addition, the connecting gear parts 362 are provided to face each other between the first driving gear 332 and the second driving gear 333 and engaged with the first driving gear 332 or the second driving gear 333 depending on the movement position of the connecting arm 361.

The connecting gear parts 362 may be coupled the driving shaft 331 passing therethrough, and the portion of the connecting gear parts 362 where the driving shaft 331 passes through and the outer surface of the driving shaft 331 may have non-linear shapes, so that the connecting gear parts 362 and the driving shaft 331 may be coupled while allowing straight movement but restricting relative rotation thereof.

For selective engagement of the connecting gear part 362 and the respective driving gears, fastening gear parts G may be formed in the first driving gear 332 and the second driving gear 333, respectively, and the connecting gear part 362 may be provided at the outer circumference of the fastening gear part G so as to match the same and may have a thread formed on the inner surface thereof.

The fastening gear parts G may be provided in the first driving gear 332 and the second driving gear 333, respectively, and may have a straight thread extending in the movement direction of the connecting arm 361.

The connecting gear part 362 has a thread formed on the inner circumference thereof so as to match the outer circumference of the fastening gear part G and mesh with the thread of the fastening gear part G. Additionally, the connecting gear part 362 is configured to freely rotate on the connecting arm 361.

Accordingly, when the connecting arm 361 moves toward the first driving gear 332 by the electromagnet part 350, the fastening gear part G of the first driving gear 332 may move into the connecting gear part 362 to mesh with each other so that the driving force of the driving motor 330 connected to the connecting gear part 362 may be transmitted to the first driving gear 332, thereby rotating the first rotation shaft 110, so the first spoiler 120 of the first spoiler device 100 may slide.

On the other hand, when the connecting arm 361 moves toward the second driving gear 333 by the electromagnet part 350, the fastening gear part G of the second driving gear 333 may move into the connecting gear part 362 to mesh with each other so that the driving force of the driving motor 330 connected to the connecting gear part 362 may be transmitted to the second driving gear 333, thereby rotating the second rotation shaft 210, so the second spoiler 220 of the second spoiler device 200 may tilt.

Meanwhile, as shown in FIGS. 8 to 10, the connecting part 360 includes a first stopper 363 and a second stopper 364.

The first stopper 363 or second stopper 364 comes into contact with the first driven gear 111 or the second driven gear 211, respectively, depending on the movement position of the connecting part 360.

In particular, it may be configured such that only one of the first stopper 363 and the second stopper 364 comes into contact with the first driven gear 111 or the second driven gear 211.

In other words, if the first stopper 363 comes into contact with the first driven gear 111, the rotation of the first driven gear 111 is blocked, and the second stopper 364 is separated from the second driven gear 211, allowing the rotation of the second driven gear 211.

On the other hand, if the second stopper 364 comes into contact with the second driven gear 211, the rotation of the second driven gear 211 is blocked, and the first stopper 363 is separated from the first driven gear 111, allowing the rotation of the first driven gear 111.

As described above, in the present disclosure, one of the first rotation shaft 110 and the second rotation shaft 210 selectively is rotated through the first stopper 363 and the second stopper 364 of the connecting part 360. In addition, when one spoiler of the first spoiler device 100 and the second spoiler device 200 switches its position, the other spoiler may remain in the fixed state at a corresponding position.

Specifically, as shown in FIG. 8, first through-holes H1 may be formed in the first driven gear 111 in the circumferential direction thereof, and second through-holes H1 may be formed in the second driven gear 211 in the circumferential direction thereof. The first stopper 363 may be configured to be insertable into the first through-holes H1, and the second stopper 364 may be configured to be insertable into the second through-holes H2.

In the present disclosure, the first stopper 363 and the second stopper 364 may be formed in the form of a pin so that the first stopper 363 may be inserted into the first through-holes H1 formed in the first driven gear 111 and so that the second stopper 364 may be inserted into the second through-holes H2 formed in the second driven gear 211.

Here, since a plurality of first through-holes H1 is formed in the first driven gear 111 along the circumferential direction thereof, the first stopper 363 may be inserted into same at various rotational positions of the first driven gear 111. Likewise, since a plurality of second through-holes H2 is formed in the second driven gear 211 along the circumferential direction thereof, the second stopper 364 may be inserted into same at various rotational positions of the second driven gear 211.

In addition, in the present disclosure, since the connecting arm 361 is located between the first driving gear 332 and the second driving gear 333, the first stopper 363 and the second stopper 364 may be formed to respectively extend from the connecting arm 361 to the outer sides of the first driven gear 111 or the second driven gear 211 and to be then bent so as to be inserted into the respective through-holes.

Through this, the present disclosure may perform position switching of the first spoiler device 100 and second spoiler device 200.

That is, as shown in FIG. 10, if the connecting arm 361 is located between the first driving gear 332 and the second driving gear 333 by the electromagnet part 350 in the initial state, position switching of the first spoiler device 100 and second spoiler device 200 is not performed.

At this time, the driving motor 330 is not driven, the first stopper 363 is in contact with the first driven gear 111, and the second stopper 364 is in contact with the second driven gear 211, so that the positions of the first spoiler device 100 and second spoiler device 200 are fixed.

Figure 11:
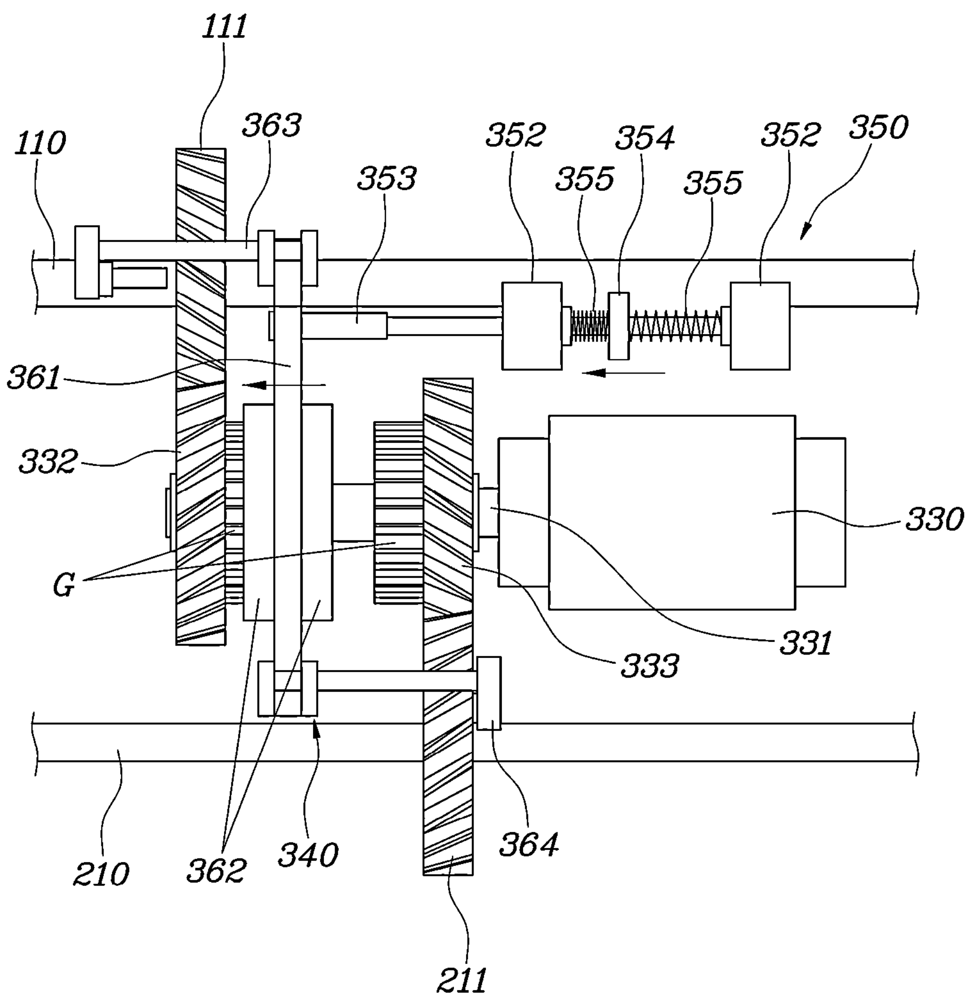
FIG. 11 is a diagram illustrating the operation of a first spoiler device in a dual spoiler apparatus according to an embodiment of the present disclosure.

Here, as shown in FIG. 11, when the sliding position of the first spoiler device 100 switches, the connecting part 360 is connected to the first driving gear 332, so that the first stopper 363 is separated from the first driven gear 111 and so that the second stopper 364 comes into contact with the second driven gear 211.

That is, if the connecting arm 361 moves toward the first driving gear 332 by the electromagnet part 350, the connecting gear part 362 of the connecting arm 361 meshes with the fastening gear part G of the first driving gear 332.

In addition, as the first stopper 363 of the connecting part 360 is separated from the first driven gear 111, the first rotation shaft 110 is allowed to rotate, and as the second stopper 364 comes into contact with the second driven gear 211, the second rotation shaft 210 is not allowed to rotate.

Here, when the driving motor 330 is driven, the sliding position of the first spoiler 120 may switch by the rotation of the connecting gear part 362, the first driving gear 332, the first driven gear 111, and the first rotation shaft 110.

Figure 12:
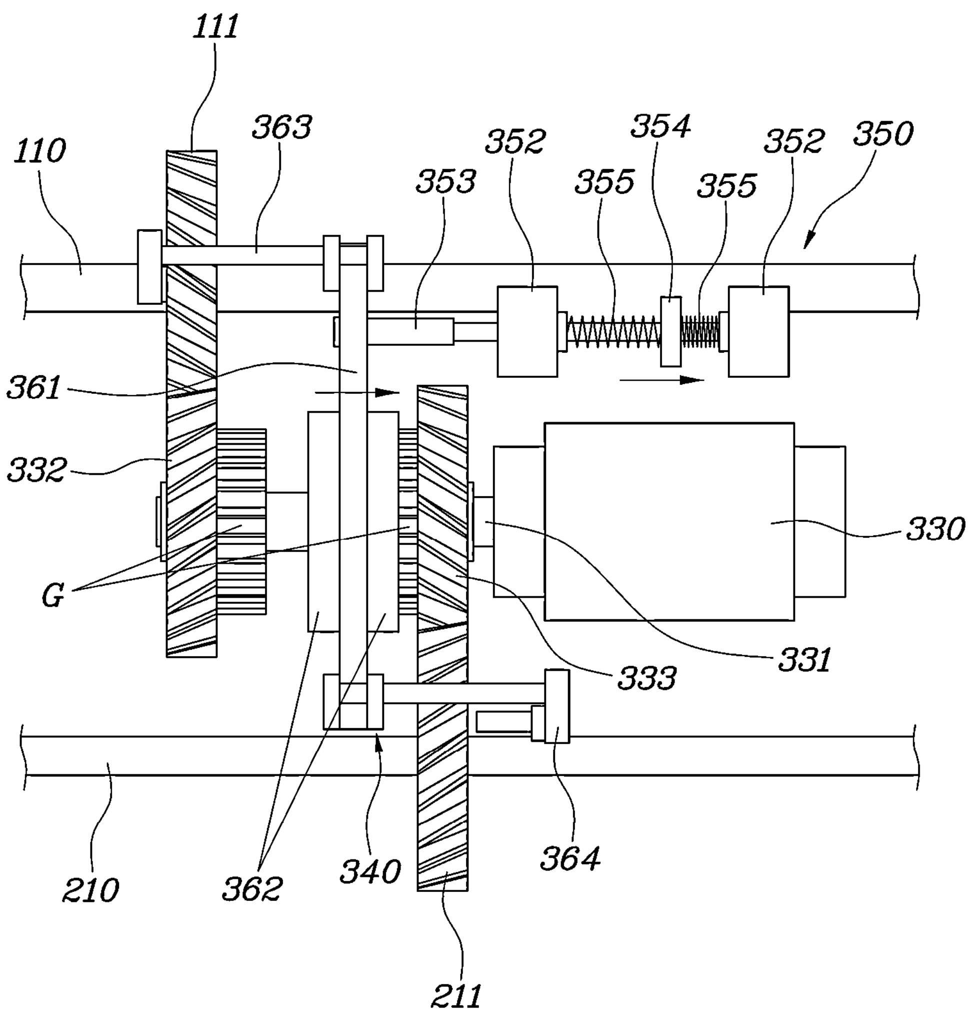
FIG. 12 is a diagram illustrating the operation of a second spoiler device in a dual spoiler apparatus according to an embodiment of the present disclosure.

Meanwhile, as shown in FIG. 12, when the tilting position of the second spoiler device 200 switches, the connecting part 360 is connected to the second driving gear 333, so that the first stopper 363 comes into contact with the first driven gear 111 and so that the second stopper 364 is separated from the second driven gear 211.

If the connecting arm 361 moves toward the second driving gear 333 by the electromagnet part 350, the connecting gear part 362 of the connecting arm 361 meshes with the fastening gear part G of the second driving gear 333.

In addition, as the second stopper 364 of the connecting part 360 is separated from the second driven gear 211, the second rotation shaft 210 is allowed to rotate, and as the first stopper 363 comes into contact with the first driven gear 111, the first rotation shaft 110 is not allowed to rotate.

Here, when the driving motor 330 is driven, the tilting position of the second spoiler 220 may switch by the rotation of the connecting gear part 362, the second driving gear 333, the second driven gear 211, and the second rotation shaft 210.

Meanwhile, a controller 400 that controls the driving device 300 may be further included. The controller 400 may control the positions of the first spoiler device 100 and the second spoiler device 200 depending on the driving speed.

Specifically, if the driving speed of the vehicle accelerates, the controller 400 may control the driving device 300 such that the first spoiler device 100 or the second spoiler device 200 is deployed in stages in proportion to the amount of acceleration.

In other words, the amount of drawing out the first spoiler device 100 and the amount of deploying the second spoiler device 200 may be adjusted in stages depending on the driving speed of the vehicle, thereby controlling the air flow. At this time, the control of the first spoiler device 100 and the second spoiler device 200 depending on the driving speed may be performed such that the control of the amount of drawing out the first spoiler device 100 precedes the control of the amount of deploying the second spoiler device 200.

Meanwhile, if it is determined that the driving speed of the vehicle rapidly decelerates, the controller 400 may control the driving device 300 such that the first spoiler device 100 is retracted and such that the second spoiler device 200 is deployed to have the maximum tilting angle.

For example, if the vehicle decelerates by 60 km/h or more within 2 seconds, it corresponds to rapid deceleration, and the second spoiler device 200 is deployed such that the tilting angle reaches the maximum, thereby implementing air brakes. Accordingly, the braking distance of the vehicle may be reduced.

Since the dual spoiler apparatus in the above-described structure is configured to change the tilting angle and length of the air spoiler, it is possible to improve aerodynamic performance by controlling the air flow to the rear of the vehicle and simplify parts for tilting and length change, thereby reducing installation space and solving quality problems.

Although the present disclosure has been described and illustrated in conjunction with particular embodiments thereof, it should be apparent to those having ordinary skill in the art that various improvements and modifications may be made to the present disclosure without departing from the technical idea of the present disclosure defined by the appended claims.

What is claimed is:

1. A dual spoiler apparatus comprising:

a first spoiler device configured to slide on a spoiler mounting portion in forward and backward directions of a vehicle;

a second spoiler device configured to tilt on the spoiler mounting portion in upward and downward directions of the vehicle; and a driving device to which the first spoiler device and the second spoiler device are connected, wherein the driving device is configured to generate a driving force to switch a sliding position of the first spoiler device and a tilting position of the second spoiler device.

2. The dual spoiler apparatus of claim 1, wherein the spoiler mounting portion corresponds to an upper rear part of the vehicle, and is configured to slide toward a rear of the vehicle when the first spoiler device is extended, and wherein the spoiler mounting portion is configured to have an angle increasing and be thus tilted when a second spoiler is deployed.

3. The dual spoiler apparatus of claim 1, wherein the first spoiler device comprises a first rotation shaft configured to rotate by receiving the driving force of the driving device and a first spoiler connected to the first rotation shaft and configured to slide when the first rotation shaft rotates, and wherein the second spoiler device comprises a second rotation shaft configured to rotate by receiving the driving force of the driving device and a second spoiler connected to the second rotation shaft and configured to tilt when the second rotation shaft rotates.

4. The dual spoiler apparatus of claim 3, wherein the first spoiler device further comprises a guide rail and a movement part, wherein the guide rail is installed in the spoiler mounting portion and extends in the forward and backward directions, and wherein the movement part is movable on the guide rail, the first spoiler is mounted to the movement part, and the first rotation shaft is connected to the movement part such that the movement part moves on the guide rail when driving force is transmitted, thereby switching the position of the first spoiler.

5. The dual spoiler apparatus of claim 3, wherein:

the second spoiler device further comprises a linkage mechanism, the linkage mechanism is installed in the spoiler mounting portion, the second spoiler is mounted to the linkage mechanism, and the linkage mechanism includes a plurality of links to which the second rotation shaft is connected, so that when driving force is transmitted, the respective links rotate to change an overall length thereof, thereby switching the tilting position of the second spoiler.

6. The dual spoiler apparatus of claim 3, wherein the driving device comprises a first driving unit and a second driving unit, wherein the first rotation shaft is connected to the first driving unit, and wherein the second rotation shaft is connected to the second driving unit.

7. The dual spoiler apparatus of claim 3, wherein the driving device comprises a driving motor and a connecting unit, and wherein the connecting unit comprises an electromagnet part and a connecting part, and is configured to be selectively connected to the first rotation shaft or the second rotation shaft based on a movement position of the connecting part so as to transmit the driving force of the driving motor.

8. The dual spoiler apparatus of claim 7, wherein the driving motor comprises a driving shaft, a first driving gear, and a second driving gear, wherein the first and second driving gears are configured to freely rotate on the driving shaft, wherein the first rotation shaft has a first driven gear configured to mesh with the first driving gear, and wherein the second rotation shaft has a second driven gear configured to mesh with the second driving gear.

9. The dual spoiler apparatus of claim 8, wherein the connecting part is provided between the first driving gear and the second driving gear and is connected to the first driving gear or the second driving gear as it moves in an axial direction by the electromagnet part.

10. The dual spoiler apparatus of claim 8, wherein the connecting part comprises:

a connecting arm coupled to the electromagnet part and extending between the first driving gear and the second driving gear, and connecting gear parts provided to face the first driving gear and the second driving gear, respectively, in the connecting arm, and configured to mesh with the first driving gear or the second driving gear, and have a driving shaft connected to pass therethrough.

11. The dual spoiler apparatus of claim 10, wherein fastening gear parts are formed in the first driving gear and the second driving gear, respectively, and wherein the connecting gear part is provided at an outer circumference of the fastening gear part so as to match the same, has a thread formed on an inner surface thereof, and is configured to rotate freely on the connecting arm.

12. The dual spoiler apparatus of claim 8, wherein the connecting part comprises a first stopper and a second stopper provided therein, and wherein the first stopper and the second stopper come into contact with the first driven gear or the second driven gear, respectively, based on the movement position of the connecting part such that one of the first stopper and the second stopper comes into contact with the first or second driven gear while the other is separated from the second or first driven gear.

13. The dual spoiler apparatus of claim 12, wherein the first driven gear has first through-holes formed in a circumferential direction thereof, wherein the second driven gear has second through-holes formed in the circumferential direction thereof, wherein the first stopper is configured to be insertable into the first through-holes, and wherein the second stopper is configured to be insertable into the second through-holes.

14. The dual spoiler apparatus of claim 12, wherein, when the sliding position of the first spoiler device switches, the connecting part is connected to the first driving gear, so that the first stopper is separated from the first driven gear and so that the second stopper comes into contact with the second driven gear, and wherein, when the tilting position of the second spoiler device switches, the connecting part is connected to the second driving gear, so that the first stopper comes into contact with the first driven gear and so that the second stopper is separated from the second driven gear.

15. The dual spoiler apparatus of claim 1, further comprising a controller configured to control the driving device, wherein the controller controls the positions of the first spoiler device and the second spoiler device depending on a driving speed.

16. The dual spoiler apparatus of claim 15, wherein when the driving speed of the vehicle accelerates, the controller is configured to control the driving device such that the first spoiler device or the second spoiler device is deployed in stages in proportion to an amount of acceleration of the vehicle.

17. The dual spoiler apparatus of claim 15, wherein when the driving speed of the vehicle decelerates, the controller is configured to control the driving device such that the first spoiler device is retracted and such that the second spoiler device is deployed to have a maximum tilting angle.

* * * * *